(12) United States Patent
Zaeri et al.

(10) Patent No.: US 11,667,174 B2
(45) Date of Patent: Jun. 6, 2023

(54) SMART ELECTRIC REFRIGERATION SYSTEM FOR VEHICLES

(71) Applicant: VOLTA AIR TECHNOLOGY INC., Abbotsford (CA)

(72) Inventors: Saeed Zaeri, Abbotsford (CA); Peter Timothy Johnston, Surrey (CA)

( * ) Notice: Subject to any disclaimer, the term of this patent is extended or adjusted under 35 U.S.C. 154(b) by 0 days.

(21) Appl. No.: 17/590,914

(22) Filed: Feb. 2, 2022

(65) Prior Publication Data

US 2022/0153086 A1 May 19, 2022

Related U.S. Application Data

(63) Continuation-in-part of application No. 15/663,453, filed on Jul. 28, 2017, now abandoned.

(60) Provisional application No. 62/368,160, filed on Jul. 28, 2016.

(51) Int. Cl.
| | |
|---|---|
| *B60H 1/32* | (2006.01) |
| *B60L 58/13* | (2019.01) |
| *B60H 1/00* | (2006.01) |
| *B60L 58/25* | (2019.01) |
| *B60L 58/26* | (2019.01) |

(52) U.S. Cl.
CPC ........... *B60H 1/3232* (2013.01); *B60H 1/004* (2013.01); *B60H 1/00428* (2013.01); *B60H 1/00771* (2013.01); *B60H 1/322* (2013.01); *B60L 58/13* (2019.02); *B60L 58/25* (2019.02); *B60L 58/26* (2019.02); *B60H 1/00278* (2013.01); *B60H 2001/3266* (2013.01)

(58) Field of Classification Search
CPC ................ B60H 1/00278; B60H 1/004; B60H 1/00428; B60H 1/00771; B60H 1/322; B60H 2001/3238; B60H 2001/327; B60H 2001/3261; B60H 2001/3266; B60L 1/003; B60L 58/13; B60L 58/25; B60L 26/26

See application file for complete search history.

(56) References Cited

U.S. PATENT DOCUMENTS

| | | | | |
|---|---|---|---|---|
| 6,158,225 | A * | 12/2000 | Muto ................. | B60H 1/00778 62/235.1 |
| 7,338,335 | B1 * | 3/2008 | Messano ............ | B60H 1/00428 903/903 |
| 8,295,950 | B1 * | 10/2012 | Wordsworth ........... | B60L 1/003 700/297 |

(Continued)

*Primary Examiner* — Eric S Ruppert
*Assistant Examiner* — Hans R Weiland
(74) *Attorney, Agent, or Firm* — Prakash Nama; Global IP Services, PLLC

(57) ABSTRACT

A smart electric temperature-controlled system connected to a vehicle, such as a vehicle-transported refrigeration system, includes a power management system and an energy storage module. The power management system and energy storage module can manage power delivered to the temperature-controlled system components by monitoring temperatures and voltages (and possibly other factors) and by delivering power as a function of the things monitored. In a typical implementation the power management system and an energy storage module can supply power to a vehicle-transported refrigeration system when the vehicle is stopped and/or power from the vehicle electrical system is electrically isolated or otherwise unavailable.

18 Claims, 4 Drawing Sheets

(56) References Cited

U.S. PATENT DOCUMENTS

| | | | |
|---|---|---|---|
| 2004/0250560 A1* | 12/2004 | Ikura | F25B 49/022 62/239 |
| 2005/0161211 A1* | 7/2005 | Zeigler | B60H 1/00778 62/236 |
| 2008/0078195 A1* | 4/2008 | Lin | B60H 1/3222 62/235.1 |
| 2009/0015203 A1* | 1/2009 | Oakes | H02J 9/002 701/99 |
| 2009/0056354 A1* | 3/2009 | Davis | B60H 1/3205 62/236 |
| 2009/0229288 A1* | 9/2009 | Alston | B60H 1/00428 62/239 |
| 2009/0266394 A1* | 10/2009 | Tsubone | H02N 11/002 136/206 |
| 2011/0067419 A1* | 3/2011 | Aoyagi | B60H 1/322 62/133 |
| 2013/0000342 A1* | 1/2013 | Blasko | B60H 1/3223 62/235.1 |
| 2013/0020864 A1* | 1/2013 | Smajlovic | B60H 1/00657 307/9.1 |
| 2013/0103242 A1* | 4/2013 | Takeuchi | B60H 1/004 180/65.265 |
| 2014/0116077 A1* | 5/2014 | Pierce | F25B 27/002 219/202 |
| 2015/0314670 A1* | 11/2015 | Lucht | F25B 49/025 62/115 |
| 2015/0338858 A1* | 11/2015 | Bates | G05D 23/00 62/157 |
| 2016/0126603 A1* | 5/2016 | Yun | B60H 1/00371 165/104.21 |
| 2017/0082335 A1* | 3/2017 | Jin | B60H 1/3232 |
| 2017/0210194 A1* | 7/2017 | Ling | H01M 10/0525 |

* cited by examiner

SMART ELECTRIC REFRIGERATION SYSTEM FOR VEHICLES

RELATED APPLICATIONS

This application is a continuation-in-part of U.S. Non-Provisional application Ser. No. 15/663,453, entitled "Mobile Hybrid Electric Refrigeration System", filed Jul. 28, 2017, which claims the benefit of U.S. Provisional Application Ser. No. 62/368,160, filed Jul. 28, 2016, which is incorporated herein in its entirety.

TECHNICAL FIELD

The present invention relates generally to a mobile hybrid electric temperature-controlled system such as a refrigeration system (and can relate to all-electric systems as well). More specifically, the present invention relates to an apparatus and method for providing electric temperature control, such as refrigeration, for mobile vehicular applications including a hybrid electric power source and control system to provide for idle free operation during vehicle engine shutdowns.

BACKGROUND

Unnecessary idling of internal combustion engines in refrigerated vehicles, particularly to maintain refrigeration cooling during extended stops as may be common in delivery vehicles, produces undesired carbon and other polluting emissions, consumes additional unnecessary fuel, increases wear and maintenance requirements on engines and ancillary equipment, and may contribute to undesirable idle-specific engine problems such as fouling or engine/exhaust deposits, and may be contrary to municipal bylaws (ordinances or local regulations) or rules against idling, for example.

Each of these disadvantages represent efficiency, environmental and financial costs to the operator of the refrigerated vehicle. Particularly in smaller sized refrigerated vehicle applications such as delivery vans and smaller trucks where refrigerated vehicles are used intermittently or on an on-demand basis with a significant portion of operating time being stopped in traffic or at delivery locations, providing refrigeration cooling without requiring constant engine idling or undesirable depletion of vehicle starter battery capacity has become a priority for the refrigerated vehicle industry. These disadvantages of conventional refrigerated vehicle systems may be further compounded in hot weather environments, where engines and vehicles may typically also be subject to operator cab air conditioning cooling demands as well as refrigeration system loads.

Some conventional vehicle refrigeration systems require engine mechanical power to drive the refrigeration system, or may impose undesirably large electrical loads on the vehicle starter battery and alternator during operation, and on battery charge storage during any engine stoppages, which may undesirably shorten any available engine-off refrigeration period, or risk undesirable starter battery wear or battery charge depletion which could strand a vehicle if the battery is depleted below the capacity required to restart the vehicle engine.

Therefore, there remains a need for an apparatus and method providing for a mobile hybrid electric refrigeration system for internal combustion engine powered vehicles and equipment. More particularly, a need exists for systems and methods to provide for electric refrigeration for mobile vehicular applications including a hybrid electric power source and control system to provide for idle free operation during vehicle engine shutdowns.

SUMMARY

It is an object of the present invention to provide a mobile hybrid electric temperature-controlled system, such as a refrigeration system, for providing idle free mobile temperature control capability (controlling cooling or heating or both; cooling and heating systems often involve similar or comparable thermodynamic elements, such as working fluid and heat exchanger elements). For purposes of simplicity, the concepts will be discussed in the context of cooling, such as during refrigerated vehicle engine shutdowns that addresses some of the limitations of the prior art.

According to an embodiment of the invention, a mobile hybrid electric refrigeration system for a refrigerated vehicle is provided which comprises:

a programmable logic controller comprising computer executable instructions to control mobile electric cooling system operation of a refrigerated vehicle;

a refrigeration system energy storage module comprising at least one rechargeable refrigeration system battery;

a battery management controller operable to control charge and discharge functions of the energy storage module;

an electric compressor (or an electric motor driving a compressor) powered by at least one of the energy storage module and a vehicle electrical system for compressing a refrigerant;

an evaporator located within a refrigerated compartment of the vehicle for cooling the refrigerated compartment by expansion of the refrigerant; and a condenser located outside of the refrigerated compartment of the vehicle for rejecting heat from the refrigerant following compression by the compressor;

wherein the programmable logic controller is operable to control a speed of the electric compressor in response to one or more of a temperature inside the refrigerated compartment, an ambient temperature outside the refrigerated compartment, a power state of the refrigeration system energy module and a voltage of the vehicle electrical system.

Further advantages of the invention will become apparent when considering the drawings in conjunction with the detailed description.

BRIEF DESCRIPTION OF THE DRAWINGS

The system of the present invention will now be described with reference to the accompanying drawing figures, in which.

DETAILED DESCRIPTION

Figure 1:
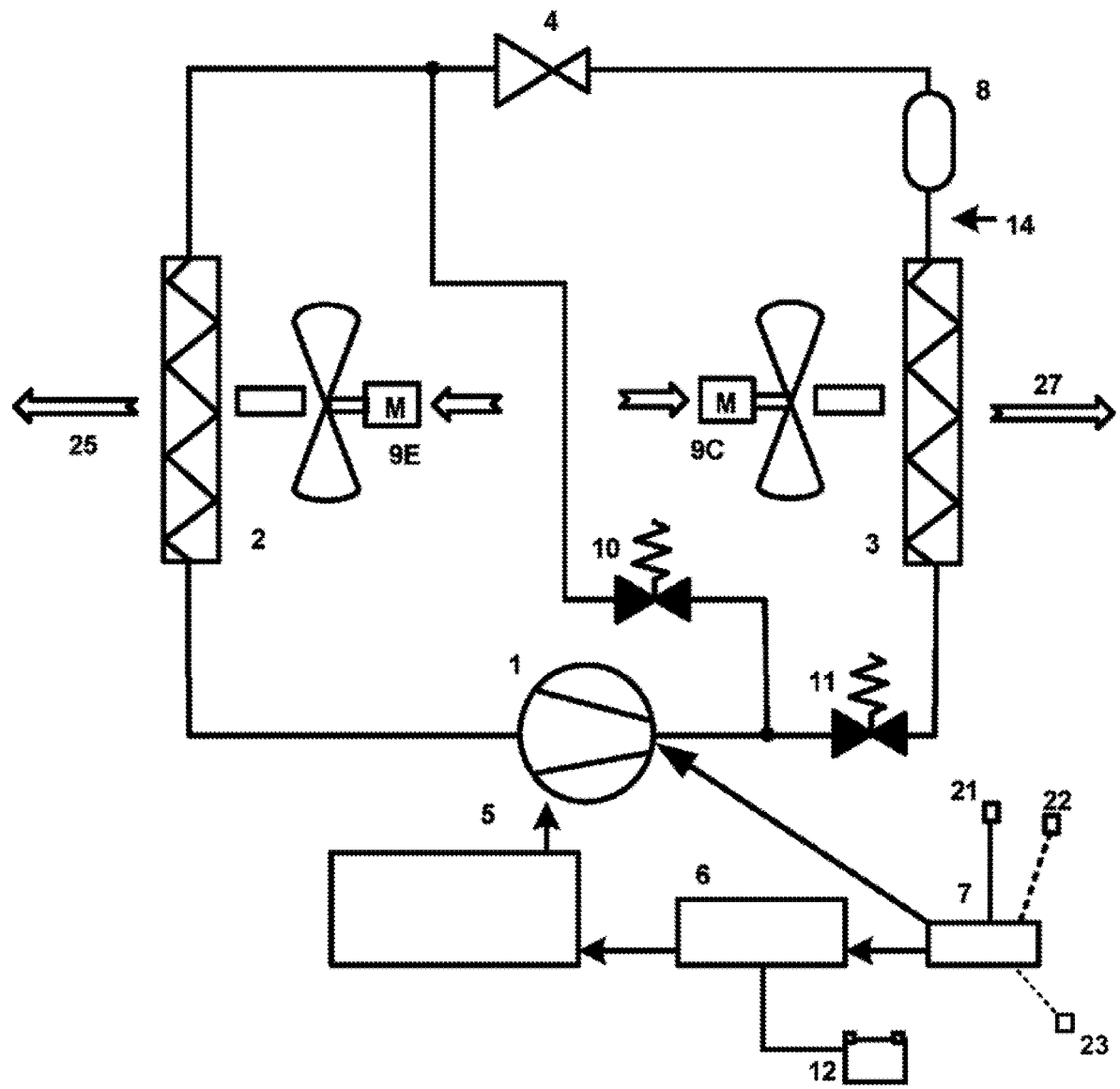
FIG. 1 illustrates a schematic diagram of a mobile hybrid electric refrigeration system according to an embodiment of the present invention.

With reference to FIG. 1, a schematic diagram of a mobile hybrid electric refrigeration system is shown, according to an embodiment of the present invention. (The notion of the system being "hybrid" may indicate that the sources of power for the system may be of a variety of kinds; the system may be similarly powered from a variety of sources that are all of the same kind as well, such as a variety of electric sources.) In one such embodiment, the mobile hybrid electric refrigeration system is adapted for installation to a suitable vehicle powered by an internal combustion engine, to provide for refrigeration or cooling of a refrigerated compartment 25 (or, more generally, a temperature-controlled compartment 25) of the refrigerated vehicle, such as to provide for cool and/or frozen storage of perishable cargo and/or temperature control of otherwise temperature sensitive cargo, for example. (Temperature control may involve cooling, heating, or temperature maintenance. Because refrigeration—colloquially, making or keeping something cool or cold relative to the ambient environment—is a commonplace concern, the concepts will be discussed in the context of refrigeration.) The vehicle is physically connected to the compartment 25, such that the vehicle is configured to transport (i.e., is adapted to transport or is capable of transporting) the compartment 25 from place to place. The vehicle and compartment 25 may be physically connected as part of a unitary structure, or as separate structures joined together. One area of application for this type of retrofit start/stop engine control is for retrofit installation in existing cargo vehicles which are powered by an internal combustion engine such as a diesel, gasoline, natural gas, propane or other suitable fuel, and which have a suitable cargo compartment 25, which may be refrigerated or cooled, such as cargo vans or trucks or the like, so as to provide for refrigeration, cooling and/or temperature control of the temperature inside the refrigerated compartment 25, for example.

In a particular embodiment, the mobile hybrid electric refrigeration system may be particularly useful in vehicles which are subject to intermittent or on-call use, such as refrigerated delivery service, but which may have typically previously required idle running for lengthy periods during operation to maintain power to a conventional refrigeration system directly or indirectly continuous powered by the vehicle's internal combustion engine, for example. Such previous requirements under conventional refrigeration systems for substantially continuous operation of the vehicle engine including idling to provide for substantially continuous operation of the refrigeration system may be undesirable given the desire to reduce fuel consumption and vehicle emissions associated with such idling, as well as requiring for an operator such as a delivery driver to leave a refrigerated vehicle running when leaving the vehicle to make deliveries, for example. Another example of such an application is for providing retrofit mobile hybrid electric refrigeration capacity for any suitable internal combustion engine-powered vehicle which may be driven intermittently but may require substantially continuous refrigeration capacity, such as to desirably provide for reduced idle time and associated fuel consumption and engine wear/maintenance requirements, while still providing for substantially continuous refrigeration of the vehicle's refrigerated compartment as needed. Considerations such as these may make the power management needs of a mobile temperature-control system different from the power management needs of other systems.

In one embodiment, the mobile hybrid electric refrigeration system comprises a programmable logic controller (PLC) 7, which comprises a processor and stores computer-executable instructions to implement the hybrid electric refrigeration system power control functionality of the system for controlling the operation of the hybrid electric refrigeration system. (The concepts described herein may be implemented with other types of processors and processor-based components as well, and are not limited to implementation with a programmable logic controller.) In one embodiment, the PLC 7 is operable to periodically and/or substantially continuously monitor system status information, and to control the refrigeration operation of the system. In one such embodiment, the PLC 7 may optionally comprise an internal or removable data storage medium (not shown) which may comprise one or more of an internal or removable memory card, chip, or other suitable memory storage medium, and may further optionally comprise a telematics module (not shown in FIG. 1), such as a wireless, cellular, or other suitable telematics interface to provide for transmission of system data and/or control signals for interfacing with the PLC 7 of the mobile hybrid electric refrigeration system, for example. In an optional such embodiment, the optional telematics module (not shown), may provide for at least one of interfacing with an external database (such as an operator database, headquarters/dispatch database and/or manufacturer database, for example) to provide for one or more features comprising: providing notifications of refrigeration system and/or vehicle status; providing an alert or alarm to an operator of a system or temperature condition such as a predetermined maximum or minimum refrigerated compartment temperature for example (setting a desired temperature may also be accomplished locally by an operator setting or adjusting a thermostat, for example); providing vehicle security or location information (such as from a vehicle GPS or other positioning system for example); software/firmware updates for updating the computer executable operating instructions for one of the PLC 7 and other programmable controllers associated with the mobile hybrid electric refrigeration system, for example. Such optional telematics module features may in one embodiment be used such as by a fleet operator and/or manufacturer of the mobile hybrid electric refrigeration system for one or more of system analysis.

In one aspect, the mobile hybrid electric refrigeration system also comprises an electric compressor 1, which is operably connected to receive electrical power from one or more of a refrigeration system energy module 5, and a vehicle electrical system 12, and is further operably and communicably connected to PLC 7 to control the operation of compressor 1. In one embodiment, electric compressor 1 is fluidly connected (such as by refrigerant piping containing a refrigerant and/or cooling fluid) to circulate a refrigerant fluid (also called a "refrigerant" and sometimes referred to as a "coolant" or a "working fluid") from an evaporator 2 which provides cooling to a refrigerated compartment 25 of the refrigerated vehicle (by transferring heat from the compartment 25 to the working fluid), and a condenser 3 for rejecting heat removed from the refrigerated compartment 25 to the ambient air 27 by condensing the compressed refrigerant fluid. In a particular embodiment, the refrigerant circuit may also comprise a refrigerant filter or drier 8, and a metering device 4 (such as a refrigerant control or expansion valve) such as to control the quantity of refrigerant circulated through the system, and to control the rate of cooling and/or temperature of the refrigerated compartment 25. The system may also comprise an electric fan or blower 9 which may provide for circulation of cooled air from the evaporator 2 (moving cooled air into the compartment 25 involves the refrigerant taking in heat at the evaporator 2), and/or heated air from heat dissipated from the condenser 3, for example. (When reference is made to a particular blower, the blower for the evaporator 2 will be identified as 9E, and the blower for the condenser 3 will be identified as 9C). In one particular embodiment, the system may also optionally comprise one or more optional hot gas defrost valve 10 (such as a solenoid valve) which may be used to bypass the metering device 4, and admit a hot gas or fluid to defrost the refrigerant circulation path if required, for example. Another example of the use of valve 10 may be to transfer heat into the refrigerated compartment 25, such as with the assistance of fan or blower 9E, warming not only the circulation path but the compartment 25 as well. A heating option valve 11 may be interposed in the circulation path between the compressor 1 and the condenser 3, such that working fluid heated by compression may be blocked from passing through the condenser 3.

In one embodiment, the refrigeration system energy module 5 comprises at least one rechargeable battery, such as any suitable known type of rechargeable battery or energy storage means for rechargeably storing energy for powering compressor 1 (although "energy" and "power" are not synonymous in a strict sense—power being energy per unit time—the terms may be used colloquially and more or less interchangeably herein to convey the concepts). In one aspect, energy module 5 comprises one or more rechargeable batteries such a lithium ion (Li-ion), lithium polymer (Li—Po), lithium iron phosphate (LFP), nickel metal hydride (NiMH), fuel cell, or lead acid storage battery, for example. In one embodiment, mobile hybrid electric refrigeration system also comprises a battery management system (BMS) 6 operable to control charge and discharge functions of the energy storage module 5, and to controllably connect and/or disconnect the energy storage module 5 and electric compressor 1 to the vehicle electrical system 12, which may typically comprise at least one lead-acid storage battery and an alternator/generator driven directly or indirectly by the vehicle's internal combustion engine when it is running, and which is functional to charge the vehicle electrical system battery and/or provide power for compressor 1 only when the vehicle engine is running. BMS 6 may control other power management functions as well, such as safety or emergency operations. Further the use of the term Battery Management System is not intended to mean that the BMS manages power only from chemical batteries; rather, the BMS 6 is a power management system that may control or otherwise manage power from a variety of sources, such as batteries.

In one embodiment, the mobile hybrid electric refrigeration system also comprises a refrigerated compartment temperature sensor 21 which may be operably connected to the PLC 7 to provide measurements and monitoring of the temperature of the inside of the refrigerated compartment 25. In an optional embodiment, the system may also comprise an optional ambient temperature sensor 22 which may be operably connected to the PLC 7 to provide measurements and monitoring of the ambient air temperature outside of the refrigerated compartment. In one such embodiment, compartment temperature sensor 21 and optional ambient temperature sensor 22 may each be communicably connected to PLC 7 to enable the PLC 7 to interface with each sensor and measure refrigerated compartment internal temperature and ambient outside air temperature, as one or more monitored conditions (such as vehicle location, refrigerant pressure, voltage supply of various power elements, temperature of various mechanical components) for determining control of the mobile hybrid electric refrigeration system.

In a particular embodiment, the PLC 7 may desirably be operable to control the operation of all aspects of the mobile hybrid electric refrigeration system so as to desirably provide for at least one of increased operating efficiency, improved fuel efficiency of the refrigerated vehicle, increased duration of refrigeration during engine shutdown intervals, reduced temperature variation of the refrigerated compartment 25 and reduced load and/or wear on the vehicle electrical system 12 (such as a vehicle alternator/generator and conventional lead-acid storage battery for example). In one embodiment, the PLC 7 may be configured to control a speed of electric compressor 1 based on at least one of a battery voltage condition of the vehicle electrical system 12, a battery voltage condition of the refrigeration energy storage module 5, a refrigerant system pressure such as may be measured at the output or discharge of the compressor 1 for example, a temperature of the refrigerated compartment 25 measured by the refrigerated compartment temperature sensor 21, and an ambient temperature measured by the optional ambient temperature sensor 22. In one such embodiment, the PLC 7 may be operable to reduce the speed of the electric compressor 1 when the battery voltage of the vehicle electrical system 12 drops below a predetermined level, such as may be associated with a low battery charge condition or high current drain condition of the vehicle electrical system 12, for example. In another embodiment, the PLC 7 may be operable to reduce the speed of the electric compressor 1 when the battery voltage and/or charge state of the refrigeration energy storage module 5 drops below a predetermined value, such as may be associated with a partially depleted energy storage capacity of one or more rechargeable batteries in the energy storage module 5, for example. In a further embodiment, the PLC 7 may be operable to reduce the speed of the electric compressor 1 when a refrigerant system pressure at the discharge or output of the compressor 1 (or at the output of the condenser 3 or at the input of the metering device 4) exceeds a predetermined level, as may be associated with a refrigerant over-pressure condition, or a maximum desired refrigerant pressure for a particular range of refrigerated compartment temperatures and ambient outside temperatures, for example. In any of the above embodiments, the PLC 7 may be operable in one aspect to reduce the speed of the electric compressor 1 so as to desirably increase the length of time in which a predetermined refrigerated compartment temperature or cooling condition can be maintained by the system during an engine shutdown of the refrigerated vehicle.

In one particular embodiment, the electric compressor 1 may comprise a brushless rotary compressor 1 which may desirably operate at the voltage of the vehicle electrical system 12. In one such embodiment, the electric compressor may desirably operate at approximately 12V DC so as to match the standard vehicle electrical system 12 voltage of many refrigerated vehicles. In another embodiment adapted for use in refrigerated vehicles having a 24V DC vehicle electrical system 12, the compressor 1 may optionally run at 24V DC, for example. In some embodiments, the one or more rechargeable batteries comprised in the refrigeration energy storage module 5 may also desirably operate at the same voltage as the vehicle electrical system, such as 12V DC or 24V DC, as may commonly be used in many refrigerated vehicles. In other alternative embodiments, the operating voltage of one or more of the compressor 1 and energy storage module 5 may differ from the vehicle electrical system 12, and one or more transformers or inverters (or other voltage regulators or converters) may be used to provide for compatibility of the refrigeration system energy storage module 5, compressor 1, and vehicle electrical system 12, for example.

In one embodiment, the PLC 7 may be operable to reduce the speed of the compressor 1 in response to one or more measured condition, such as one or more of refrigerated compartment and ambient temperatures, voltage conditions of the vehicle electrical system or refrigeration energy storage module 5, and a refrigerant pressure at the discharge of compressor 1 (or at other places in the circulation path), such as by controlling the voltage and/or current provided to the compressor 1 to reduce its speed to one or more predetermined alternative operating speeds. In one such embodiment, the compressor may be capable of operation at a high and a low speed, and the PLC 7 may be operable to control the compressor 1 to operate at either of the high and/or low speeds in response on one or more of the above-noted measured conditions for example. In another embodiment, the PLC 7 may be operable to control the compressor 1 to operate at one or more of a multiplicity of predetermined compressor speeds, such as 3 or 4 or more predetermined preset compressor speeds, such as may be desirable to more accurately select a compressor speed in response to the measured conditions. In yet another embodiment, the PLC 7 may be operable to control the speed of the compressor 1 in a substantially continuously variable manner, such as to allow control of compressor speed over a range of potential speeds, such as may be desirably to provide for fully variable speed control to respond to a wide range of measured conditions. In one such embodiment, pulse width modulation (PWM) may be used to provide for substantially continuously variable control of the speed of the compressor 1 by the PLC 7, for example. In the case of a compressor 1 driven by an electric motor (not shown in FIG. 1), PWM may be used to control the speed of the electric motor.

In another embodiment, the PLC 7 may also be operable to increase the speed of compressor 1 in response to one or more monitored conditions (and decrease or otherwise control the speed of compressor 1 as well; for purposes of discussion, it may be assumed that more cooling is desired, for which increasing the speed of the compressor 1 may be appropriate). In one such embodiment, the PLC 7 may increase the speed of compressor 1 in response to a high cooling load condition as may be indicated by at least one of a higher than desired temperature of the refrigerated compartment 25 as measured by temperature sensor 21, and a higher ambient temperature in the ambient environment 27 as may be measured by optional temperature sensor 22, for example. Controlling the compressor 1 may be combined with controlling other components at the same time or near the same time. For example, the PLC 7 may increase the speed of the compressor 1 and contemporaneously decrease the speed of motor 9E (such as when the difference between the temperature of the compartment 25 and the temperature of the evaporator 2 is too low). In another embodiment, the PLC 7 may increase the speed of compressor 1 in response to a voltage condition of at least one of the vehicle electrical system 12 and the energy storage module 5, as may be indicated when sufficient power supply capacity is available to support increased cooling such as when the refrigerated vehicle engine has been restarted after a stoppage, or when the energy storage module 5 charge capacity exceeds a predetermined minimum, or when the refrigerated vehicle is connected to an external power source such as a shore power connection, for example. Similar to as described above with reference to operation of the PLC 7 to reduce the speed of the compressor 1, in some embodiments, the PLC 7 may also be operable to increase the speed of the compressor 1 by controlling the compressor to run at a higher one of one or more predetermined speeds, or alternatively, may provide for increasing the speed of the compressor 1 over a substantially continuous speed range, such as by means of pulse width modulation (PWM) control, for example.

In a further embodiment, the PLC 7 may also desirably control the speed of fan or blower 9 for controlling airflow within the refrigerated compartment 25 and over the evaporator 2, and/or also for controlling airflow from the condenser 3 to reject heat to the ambient environment 27. Various fans or blowers 9 may be independently controlled. In one such embodiment, the PLC 7 may desirably control the speed of fan or blower 9 in correspondence with the speed of compressor 1, so as to provide increased airflow in connection with increased cooling during higher running speeds of compressor 1, for example.

In one embodiment, the battery management system or BMS 6 may comprise a controller that is operable to control at least one of charging and discharging operation of at least one rechargeable battery in the refrigeration energy storage module 5, such as of one or more lithium based rechargeable batteries, for example. In one such embodiment, the BMS 6 may comprise at least one programmable controller so as to provide for control of charging of the energy storage module 5 using electrical energy from the vehicle electrical system 12, when a battery voltage of the vehicle electrical system 12 is above a predetermined value, such as may be the case when the vehicle electrical system 12 is operating at a suitable load and charge state as to allow for charging of the energy storage module 5 from the vehicle electrical system 12 without undue wear or load on the vehicle electrical system components. In a particular such embodiment, the BMS 6 may be operable to provide for charging of the energy storage module 5 when the voltage of the vehicle electrical system 12 is above about 13 V DC, and more particular above about 13.2V DC, as may correspond to an acceptable load and charge state of the vehicle system 12 to allow for charging of the energy storage module 6 in some common vehicle systems comprising an alternator and nominally 12V lead-acid vehicle battery, for example. In another embodiment, the BMS 6 may provide for controlling the rate of charging of the energy storage module 5, so as to avoid undesirable increases in rechargeable battery temperatures and/or thermal runaway which may potentially occur with overcharging of some rechargeable batteries such as lithium based batteries, which may be used in the energy storage module 5, for example. In yet a further embodiment, the BMS 6 may also provide for control of discharging of the one or more rechargeable batteries of the refrigeration energy storage module 5, such as to control the rate of discharge to a previously determined safe value, as may be desirable to prevent overheating or thermal runaway which may potentially occur under extreme discharge conditions in lithium based batteries, for example. In a particular such embodiment using a lithium based battery in the energy storage module 5, the BMS 5 may desirably control charging of the lithium battery at a charge rate less than or equal to about 1 C (or 1.times. the battery storage capacity/hr), and discharging of the battery to less than or equal to about 2 C, such as to limit potential for thermal or overcurrent damage of the battery, for example.

In one aspect, the BMS 6 may also control one or more switches to provide for disconnection of a charging connection between the vehicle electrical system 12 and the energy storage module 5 during particular conditions, such as during starting of the engine of the refrigerated vehicle, such as to avoid connection with the rechargeable battery(ies) of the energy storage module 5 when the vehicle electrical system 12 is subject to extreme current draws as may typically be the case during engine starting. In one such embodiment, the BMS 6 may desirably disconnect the energy storage module 5 from the vehicle electrical system 12 when an engine starter motor is engaged, or when a current draw of the vehicle electrical system 12 exceeds a predetermined value, for example. In another embodiment, the BMS 6 may also be operable to optionally disconnect the energy storage module 5 battery(ies) from the vehicle electrical system 12 during undesirably high or low voltages of the vehicle electrical system 12, such as by monitoring the voltage of the vehicle electrical system 12, for example. In yet a further embodiment, the BMS 6 may also be operable to optionally reduce charging and/or discharging rates of the battery(ies) of the energy storage module 5 during undesirably high or low ambient or rechargeable battery internal temperatures, such as may be measured by the optional ambient temperature sensor 22, or a further optional battery temperature sensor (not shown) within the energy storage module 5 or BMS 6.

In another embodiment, the BMS 6 may also optionally provide for controllably connecting energy module 5 and/or compressor 1 to an external mains power supply (not shown) such as a shore power connection or power cable or outlet which may be connected to a nominal mains power system such as a nominal 120V AC power system, for example (or 240V system as may be commonly used in some locations). In one such embodiment, the BMS 6 may provide for control of connection of the energy storage module 5 to the mains power supply to provide for charging of the one or more batteries of the energy storage module 5, or to directly power the compressor 1 from the mains power supply, for example. In one such system, BMS 6 may comprise any required transformer, inverter, rectifier, etc. as may be necessary and commonly used for providing a compatible power supply to the energy storage module 5 and/or compressor 1 such as at 12V or 24V DC, for example.

In yet a further optional embodiment, the mobile hybrid electric refrigeration system may further comprise at least one solar cell or solar cell array (not shown) as may be optionally provided to allow for powering the compressor 1 and/or charging the energy storage module 5 using solar generated power. In one such optional embodiment, the one or more solar panels may be suitably mounted on the exterior of the refrigerated vehicle (such as on the roof, which may include the rooftop of the compartment 25, outside the compartment 25, for example) so as to provide for extended operation of the mobile refrigeration system using power from the energy storage module 5 and solar cells, while reducing the requirement for use of energy from the vehicle electrical system 12, thereby desirably reducing the load on the vehicle electrical system 12 and improving fuel efficiency of the vehicle, and also desirably providing for extended operation of the mobile hybrid electric refrigeration system during periods of engine stoppage, while reducing the depletion of the energy storage module 5 during such stoppages. In one such embodiment including solar panels, the mobile hybrid electric refrigeration system may desirably provide power for operation of the compressor 1 during normal operation substantially entirely from the solar panel and energy storage module 5, and may only during periods of high cooling demand (such as during initial cooldown of the refrigerated compartment 25 from ambient temperature or re-cool operation following opening of the refrigerated compartment doors, for example) require substantial input of power from the vehicle electrical system 12, as may be desired for improving fuel efficiency of the vehicle and reducing wear and load on the vehicle electrical system components.

In a further embodiment, at least one or more of the above-described features of the BMS 6 may alternatively be provided by the PLC 7, such as by transferring any required programming and/or connections from the programmable controller of the BMS 6 to the PLC 7. In one embodiment, the functions of both the BMS 6 and PLC 7 may be provided by one centralized controller, such as PLC 7, for example.

Figure 2:
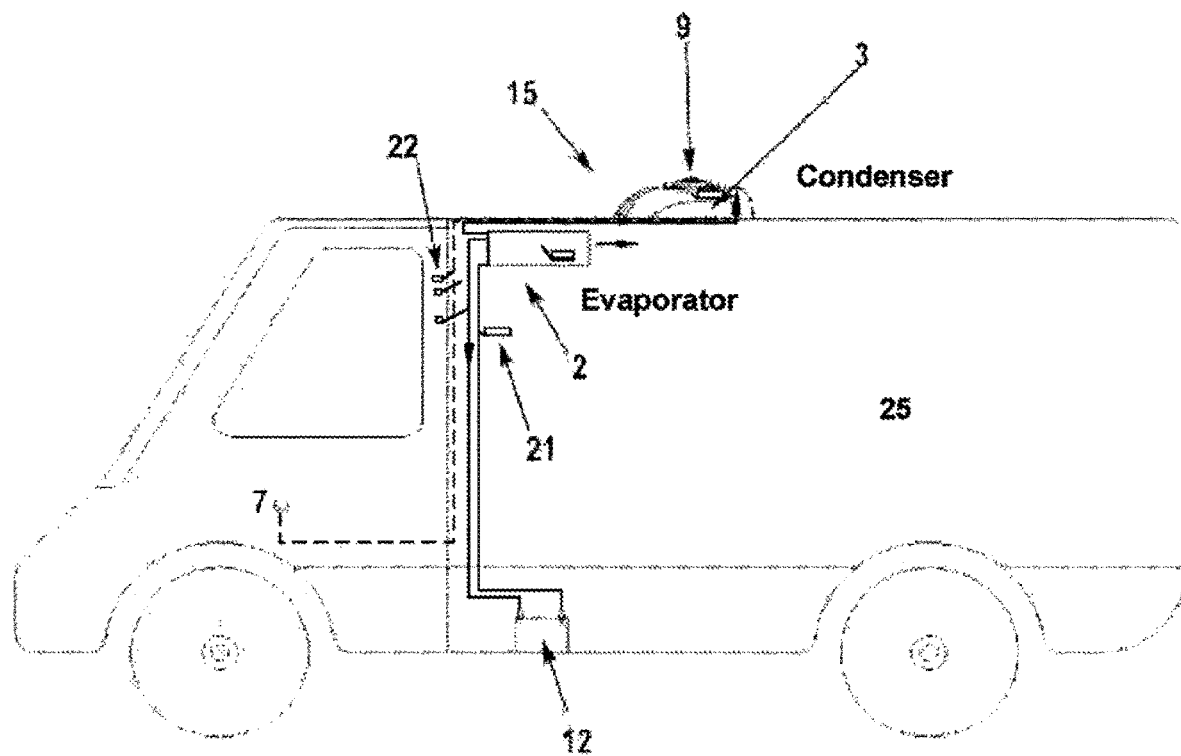
FIG. 2 illustrates a schematic diagram of a refrigerated vehicle comprising a mobile hybrid electric refrigeration system connected to the refrigerated vehicle electrical system, according to an embodiment of the invention.

Referring now to FIG. 2, a schematic diagram of an illustrative refrigerated vehicle comprising a mobile hybrid electric refrigeration system connected to the refrigerated vehicle electrical system is shown, according to an embodiment of the invention. In one such embodiment, the evaporator 2 and associated evaporator fan or blower (not shown) and the refrigerated compartment temperature sensor 21 may be located within the refrigerated compartment of the vehicle, so as to provide for cooling of the compartment and monitoring of the compartment temperature by the PLC 7. In one such embodiment, the PLC 7 may be located in any suitable location in the vehicle, such as in the vicinity of the refrigerated compartment, or alternatively in the vicinity of or within the vehicle cab, as is shown in FIG. 2 and as may be desirable to provide for operator interface and operator controls or displays for providing information to the operator regarding the operation and status of the mobile hybrid electric refrigeration system, for example. In a particular optional embodiment, an optional ambient temperature sensor 22 may also be located on the vehicle outside of the refrigerated compartment, and preferably exposed to the ambient environment outside the vehicle, such as to provide an accurate measurement of the ambient outside temperature by the PLC 7, for example.

In one embodiment, the condenser 3 and condenser fan or blower 9C may be provided in an external enclosure 15 for attachment to a suitable location on the exterior of the vehicle, such as the rooftop of the vehicle above the refrigerated compartment, where the enclosure 15 may be provided with adequate cooling air flow from the ambient environment to provide for suitable cooling of the condenser 3 and associated refrigeration system equipment.

Figure 3:
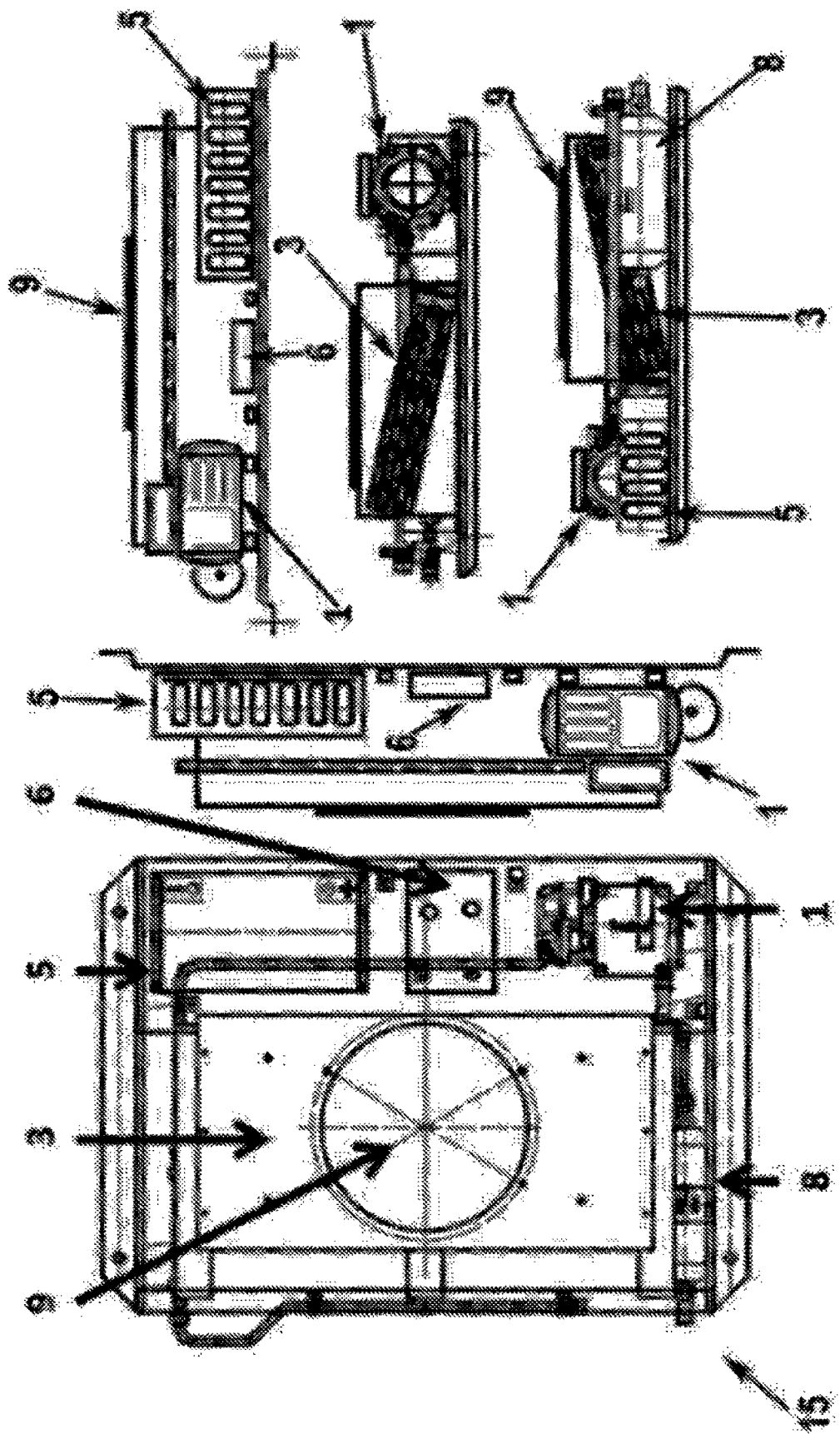
FIG. 3 illustrates an exemplary mobile refrigeration external enclosure associated with a mobile hybrid electric refrigeration system, according to an embodiment of the invention.

Referring now to FIG. 3, an exemplary mobile refrigeration external enclosure 15 associated with a mobile hybrid electric refrigeration system is shown, according to an embodiment of the invention. In one such embodiment, the external enclosure 15 may be adapted for attachment to a suitable location on the exterior of a refrigerated vehicle, such as on the rooftop of a refrigerated truck or trailer, such as to provide for an adequate supply of cooling air flow from the ambient environment, and for proximity to the refrigerated compartment. In one embodiment, the external enclosure 15 comprises the condenser 3 and associated condenser fan or blower 9C of the mobile hybrid electric refrigeration system, and also the compressor 1, so as to provide for cooling of the compressor 1 by at least one of ambient air flow and the condenser fan or blower 9C, for example. In another embodiment, the refrigeration energy storage module 5 may also be located inside the external enclosure 15, so as to provide for cooling of the one or more rechargeable batteries of the energy storage module 5, and also desirably to provide for location of the energy storage module 5 in a location outside the cab or any interior compartment of the vehicle for any venting, safety or sealing requirements with respect to the rechargeable batteries of the energy storage module 5, as may typically be required by regulations in many jurisdictions governing use of storage batteries such as lithium based batteries in vehicular applications.

In yet another embodiment, the BMS 6 may also be co-located within the external enclosure 15, such as to provide for proximity to the refrigeration energy storage module 5 which it controls. Also in another embodiment, a refrigerant filter or drier module 8 may be co-located within the external enclosure 15, so as to provide for filtration and/or drying of the refrigerant fluid in proximity to the compressor 1 and condenser 3 components of the refrigerant fluid loop.

In a particular embodiment, the external enclosure 15 may desirably be designed to provide for housing of all the components of the mobile hybrid electric refrigeration system which are required to be located outside the refrigerated compartment and outside of the vehicle, so as to desirably provide for a single component external enclosure 15 suitable for mounting at a single location on the refrigerated vehicle, such as the roof of the refrigerated compartment or cab, so as to desirably reduce the complexity, expense and time required for installation of the mobile hybrid electric refrigeration system, as may be particularly desirable for smaller refrigerated delivery vehicles such as vans and small trucks, and also for ease of installation by distributers, installers and/or end-users of the mobile hybrid electric refrigeration system.

Figure 4:
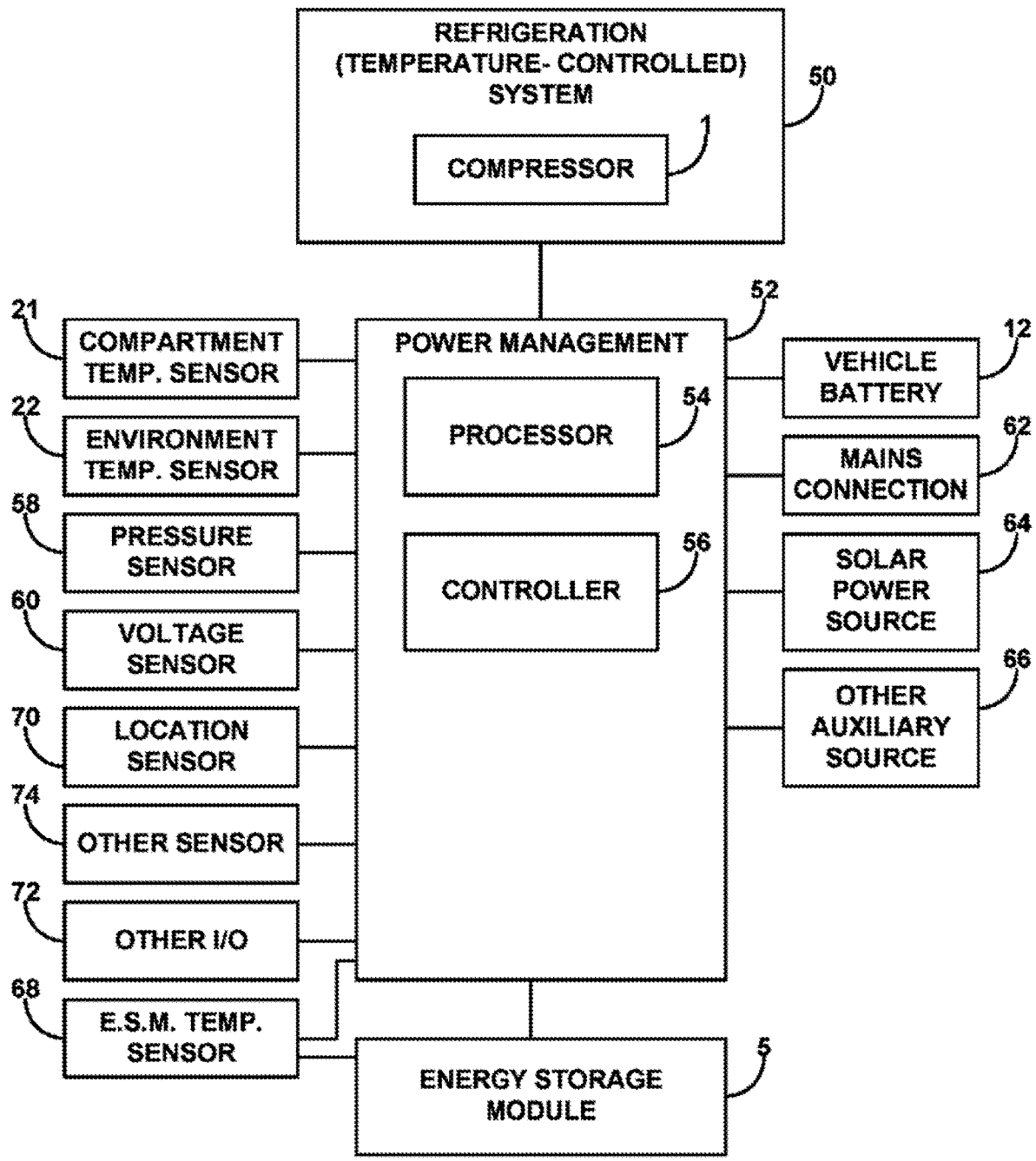
FIG. 4 illustrates a schematic diagram of a power management system and related components according to various embodiments.

FIG. 4 is a schematic diagram illustrating concepts previously discussed and demonstrating some potential advantages of the described concepts. In FIG. 4, a temperature control or refrigeration system 50 is depicted. The connections depicted in FIG. 4 are illustrative, and various components may be connected in ways not expressly depicted in FIG. 4.

The refrigeration system 50 includes a compressor 1. Although other components of the refrigeration system 50 (such as blowers/fans 9, not shown in FIG. 4) may consume power, power consumption by the compressor 1 may be more significant to power management. The refrigeration system 50 may include heat exchange elements (such as a condenser 3 and an evaporator 2, not shown in FIG. 4), and a metering device 4 (not shown in FIG. 4) that converts working fluid at high pressure and moderate temperature to lower pressure and colder temperature, and fluid conductors for a circulation path and other related elements. In colloquial terms, the refrigeration system 50 may be part of an ordinary refrigeration vehicle having conventional temperature controls (not shown in FIG. 4).

The refrigeration system 50 may be operated more efficiently and effectively, and in a notably more useful manner in view of considerations such as those discussed above, by introduction of a power management system 52.

A potential benefit of the concepts described herein is that an ordinary refrigeration vehicle having refrigeration system 50 may be augmented, retrofitted, enhanced, improved or otherwise modified by introduction of the power management system 52. Colloquially speaking, an owner of a conventional refrigeration truck (or other temperature-controlled vehicle) can add a power management system to the conventional refrigeration truck and have a truck that may operate more effectively or efficiently under various conditions.

A further potential benefit is that a vehicle-based temperature control system that includes such concepts as part of a whole system (as opposed to an augmented or retrofitted system) may utilize the concepts as well. Such a whole system may offer further benefits. For example, a whole system may offer ease of use advantages, and may utilize sensors that are built-in rather than sensors that may have to be added on.

As shown in FIG. 4, the power management system 52 includes a processor 54, which may include or be embodied in PLC 7. The processor 52 stores computer-executable instructions in any form of memory (including but not limited to fast storage and temporary storage of instructions for execution). Some instructions may encoded in hardware or software or any combination of both.

The processor 54 receives one or more inputs, and generates outputs as a function of the inputs. The power management system 52 also includes a controller 56, which may include or be embodied in BMS 6. As discussed previously, the functions of these components 52, 54 need not be part of distinct components, and functionality need not be rigidly defined as belonging to one component or the other. The processor 54 and the controller 56 are operably connected to one another, and cooperate to control the power supplied to the refrigeration system 50 or various components thereof. For purposes of FIG. 4, the processor 54 represents one or more processing or decision-making elements (which may be but need not be located in a single physical structure) that receive inputs and generate outputs and control commands or signals to the controller 56, which carries out the control commands. The control commands generally pertain to control of a temperature-controlled system 50. In a typical implementation, the control commands pertain to how power is delivered to a refrigeration system 50, and in what quantities, and under what conditions, and by what power supply elements.

As "operably connected" elements, the processor 54 and controller 56 are connected to one another, directly or indirectly, by any of physical or communicative (including wireless communication) connections, such that they can send or receive signals, send or receive instructions/commands, send or receive data, or otherwise operate as described herein.

The processor 54 and the controller 56 may cooperate to control the supply of power to power-consuming components such as the compressor 1. Some embodiments of the compressor 1 may be controlled with an electronic control technique such as PWM, as was previously discussed. In such cases, the processor 54 and the controller 56 may generate a control signal, such as a PWM signal, to control the operation of the compressor 1. Other embodiments of the compressor 1 have a built-in control system that may operate the compressor 1 at any of several levels or speeds. In such cases, the processor 54 and the controller 56 may control the compressor 1 through the built-in control system.

Two typical inputs to the power management system 52 pertain to temperature. A compartment temperature sensor 21 sends a signal to the power management system 52 as a function of the temperature of the temperature-controlled compartment 25. In typical embodiments, there may be more than one compartment temperature sensor 21, such that the sensors detect temperatures at two sites in the compartment 25 separated by space. For example, one sensor may be deployed near the front of the compartment 25 (e.g., away from the door to the compartment 25) and another sensor deployed elsewhere (e.g., closer to the door). In some embodiments, compartment temperature sensor 21 may be a temperature sensor that was built into the compartment 25. In other embodiments, compartment temperature sensor 21 may be a temperature sensor that was added on as part of an augmented system. A temperature sensor 21 may be a part of another component, such as a thermostat. The power management system 52 may receive input from any or all of such sensors 21.

An environment temperature sensor 22 sends a signal to the power management system 52 as a function of the temperature of the exterior or ambient environment. As with compartment temperature sensor 21, there may be more than one environment temperature sensor 22, and such sensors 22 may be built-in or added on. An environment temperature sensor 22 may be deployed anywhere on the vehicle, and may be a part of another component. The power management system 52 may receive input from any or all of such sensors 22.

Generally speaking, the signals from the temperature sensors 21, 22 are useful to the power management system 52 in determining whether more power ought to be supplied to the refrigeration control system 50. The power management system 52 may take into consideration the present temperature (or temperatures) inside the compartment 25, the desired or target temperature (or temperatures) inside the compartment 25, the present or desired temperatures of various components (such as the evaporator 2), factors involving heat transfer (such as, but not limited to, the insulation rating of the compartment, the size of the compartment, the amount of cargo in the compartment, and the ambient temperature), efficiency/performance of solar panels 64, and other factors.

The power management system 52 may also receive input from a pressure sensor 58, which generates a signal as a function of a pressure of the working fluid. In a typical implementation, the pressure sensor 58 may be deployed (in the circulation path shown in FIG. 1) interposed between the condenser 3 and the drier 8 (e.g., the site indicated by reference numeral 14). In this location, the sensor would sense the pressure of the still-compressed working fluid, after heat has been rejected by the condenser 3. The pressure sensor 58 may be a sensor that can monitor high liquid pressure. Pressure detected by the pressure sensor 58 may indicate, among other things, whether the working fluid may be over-pressurized or the degree of cooling that can be expected to occur when the working fluid is de-pressurized by the metering device 4.

The power management system may also receive input from a voltage sensor 60, and typically from a plurality of voltage sensors 60. (Since voltage and electrical current are related, current sensors may also be used in some implementations. As used herein, "voltage sensor" may include one or more current sensors.) Voltage sensors 60 monitor the output voltage at any of several locations where electric power is supplied or consumed. For example, a voltage sensor 60 may monitor the output of the vehicle battery 12 (including extreme current draws) or the voltage at the power mains 62 connection, or the voltage at the output of a solar power source 64, or the voltage at the output of an auxiliary power source 66, or the voltage at the output of the energy storage module 5, or the voltage at an alternator or inverter or power conditioner (not shown). Such monitoring may be useful to the power management system 52 in evaluating the output of various components, health of the components, state of charge, and other factors. Colloquially speaking, the voltage monitoring enables the power management system 52 to determine what sources can supply power and in what quantities, and where power ought to go. Power needs are often dynamic. For example, the power management system 52 may draw power from the energy storage module 5 when the energy storage module 5 is fully charged, and the power management system 52 may supply power to charge the energy storage module 5 when the energy storage module 5 is depleted. Although not depicted in FIG. 4, a charging apparatus that stores power in (or recharges in any fashion) the energy storage module 5 may be included in the energy storage module 5 itself or may be operably connected to the energy storage module 5.

As mentioned above, the controller 56 may disconnect a power supply from the refrigeration system 50, e.g., by opening one or more electronically controlled switches. For example, during start of the vehicle engine, the vehicle electrical system 12 may be electrically isolated from the energy storage module 5 to avoid extreme current draws, as may typically be the case during engine starting.

Some embodiments may include a temperature sensor 68 that monitors the temperature of the energy storage module 5. As already noted, some rechargeable battery temperatures (for example) may be monitored, and the role of such power sources may be a function of temperature. Whether power is drawn from the energy storage module 5, for instance, may depend not only upon the voltage detected by a voltage sensor 60, but also upon the temperature detected by the temperature sensor 68.

Additional temperature sensors (not explicitly shown in FIG. 4) may be deployed elsewhere, such as at various places along the circulation path (e.g., near the output of the evaporator 2 or the output of the condenser 3, or on the components themselves).

In some implementations, the power management system 52 may receive data from one or more location sensors 70. Examples of locations sensors include a Global Positioning System (GPS) sensor, and a device that detects in which cell of a cellular communication system the device resides. Location sensors 70 can supply data in the form of locations signals to the power management system 52 by which the power management system 52 may determine where the vehicle is with respect to any reference (such as a landmark, a city, a road or the Earth itself), where the vehicle is going, how fast the vehicle is traveling, and so forth. Such data may be useful in predicting what the ambient temperatures may be in the near future. Based upon on-board data or data received by other input/output sources 62, the power management system 52 may determine that the vehicle will be moving from a cloudy region into a sunny region, or that the vehicle will be ascending from a lower warm altitude to a cooler high altitude. Such determinations may pertain not only to ambient weather conditions, but also to component performance. For example, sunshine and ambient temperature may affect the performance or efficiency of a solar power source 64. Consequently, the power management system 52 may manage power as a function of current conditions and future expected conditions.

Other optional sensors 74 may supply data to the power management system 52 as well, such as an evaporator temperature sensor that monitors the temperatures proximate to the evaporator 2 (such as evaporator air and coil temperature inside of the compartment 25), one or more humidity sensors (in the compartment 25 or outside the compartment 25), door-open sensors, light intensity sensors, sound sensors, or sensors that detect the levelness or incline of the compartment 25, and the direction of any incline. As with the sensors described already, the optional sensors 74 may generate a signal meaningful to the power management system 52 (e.g., by modulating an electrical signal, or encoding an electrical signal or supplying an electrical signal) as a function of some quality or condition being sensed. "As a function of" means "based upon" but does not necessarily mean "based exclusively upon." In typical cases, the signal is representative of the quality or condition of interest, and may be, but need not be, a numerical value.

The solar power source 64 (previous mentioned as comprising at least one solar cell or solar cell array or solar panel) may be of any of several types. Other auxiliary sources 66 may likewise be of any of several types, such as an auxiliary generator or a power source that is made practical for use with a temperature-controlled vehicle.

Other input/output sources 62 may be any other forms of input or output. On example of an input/output source 62 is the telematics module mentioned previously, which may enable a wireless data connection to a cell system or other data system, which can supply information to the power management system 52 about current and future weather, traffic conditions, map routes, and other forms of useful information. Implementation of one or more embodiments of the concepts described herein may result in one or more advantages, some of which have been mentioned already. Although described principally in the context of refrigeration and cooling, the concepts can be adapted to heating systems as well. Further, the concepts are adaptable to a variety of vehicles having a variety of power sources, including internal combustion vehicles, vehicles that are powered by internal combustion and electric power (such as hybrid vehicles), vehicles that are powered by an external source (such as powered by a an electrified rail), or vehicles that are fully electric and burn no fuels at all. The power management concerns may vary from vehicle type to vehicle type, but the concepts described herein may be adaptable to them all.

The power management system 52 may further receive data related to the vehicle and the routes including: fuel status, battery status, speed of the vehicle, direction travelled by the vehicle, inclination of the vehicle, distance travelled since last full charge of the batteries, distance travelled since last fuel refill, previously travelled routes, scheduled trip routes, weather conditions (including but not limited to temperature, humidity, wind speed, wind direction, solar irradiance, etc.) and topographical information (such as altitude gained, route inclination, etc.) of the previously travelled routes and scheduled trip routes, approximate number of stops and duration of each stop in the scheduled trip route, traffic conditions (live and historical) of previously travelled routes and scheduled trip routes, regulatory conditions such as emission norms of the scheduled trip routes, historical data related to previous trips (including but not limited to time taken to complete the trip, power consumed during the trip, number of stops during the trip, weather and traffic conditions during the trip) and the like. One or more of these data elements are processed by the processor to determine a trip factor that may be used to determine (along with other conditions) the optimal power management strategy to provide efficient cooling inside the temperature-controlled refrigeration system.

Furthermore, parameters including insulation rating of the compartment, the size of the compartment, the amount of cargo in the compartment, number of door openings during a scheduled trip, and duration of each door opening may also be taken into consideration for determining a heat transfer factor which may be used in determining the amount of power required to provide effective cooling within the refrigeration system.

Based on the received data (trip factor) and heat transfer factors, the power management system 52 may calculate using the processor 54 and determine an optimal route that may be taken by the operator of the vehicle. The operator of the vehicle may either be provided with a scheduled route or may be allowed to input a destination or a route to be travelled by the vehicle. The processor may use historical data related to the route (including information from previous trips, weather/traffic conditions during the previous trip, and the like) and co-relate the same with present conditions (including live weather/traffic conditions, current power status, current fuel status) to determine a maximum amount of time during which optimal cooling may be provided by the refrigeration system. Current power requirements and future power requirements may be calculated using the received data. Furthermore, the power management system may take into consideration information including total number of stops, stop durations, total number of door open/close instances, approximate door open time, and the like, to further optimize the route and cooling conditions.

If the scheduled route is preloaded, the power management system 52 may process historical and live data to determine an optimized working condition for the refrigeration system. The optimized working condition may include efficient use of the cooling system and power systems to provide maximum cooling time inside the refrigeration compartment. The power sources used in running the refrigeration systems may be adapted intelligently based on the weather, traffic and regulatory conditions. The operator of the vehicle may be provided with an optimal route and working condition for the refrigeration compartment to work efficiently and effectively throughout the scheduled trip.

The power management system 52 may further monitor change in weather and working conditions in real-time. If the ambient temperature fluctuates unexpectedly and the working conditions of the refrigeration system changes, the same may be intimated to the operator in real-time via notifications. Changes to ambient environment factors and the effect on the route may be determined in real-time and communicated to the operator. If the power management system 52 determines that the expected cooling cannot be provided until the completion of the trip based on the current energy status and environmental factors, the same will be notified to the operator. Alternative routes, suggested change in stops and stop durations, and the like, may be determined and suggested to the operator to minimize potential downsides.

The power sources used to run the refrigeration system may also be intelligently managed by the power management system 52 depending upon the requirements of a scheduled route and external environmental factors. If a solar power source is provided for charging the batteries along with the charging provided by the internal combustion engine, the power management system 52 may configure the system to primarily rely upon the solar power source for charging the batteries. The power management system 52 may receive data related to the routes and timings of a trip based on which it may determine the availability of sunshine and determine if solar power can be relied upon during the trip. The power management system 52 may consider such information while planning the charging cycles or determining backup power availability and notify the same to the operator.

The operator of the vehicle may include a human operator such as a human driver or an autonomous vehicle driving system. The vehicle may be autonomous, human-controlled, or may be operated using a combination of both. If the vehicle is an autonomous vehicle, the power management system 52 may communicate with the navigation controller of the autonomous vehicle. If the vehicle is manually operator by a human, communication may be provided between the power management system 52 and the human operator. A combination of both the abovementioned scenarios may also be supported by the present disclosure as understood by a person skilled in the art.

The power management system 52 notifies the operator of the vehicle with information pertaining to the trip factor including one or more routes to be taken by the vehicle to achieve an optimal energy efficiency while maintaining a baseline cooling efficiency within the compartment. That is, depending upon stops to be made in a scheduled trip, one or more routes are mapped by the processor by taking into consideration the parameters including live and historical weather and traffic conditions, stop durations, and the like (trip factor is determined based on a list of parameters as described earlier in this disclosure) to achieve an optimal energy efficiency while maintaining a baseline cooling efficiency within the refrigerated compartment. Herein the optimal energy efficiency is calculated based on the cooling requirement of the refrigerated compartment including heat transfer factors. Baseline cooling efficiency refers to the minimum amount of cooling that is to be provided within the refrigerated compartment to achieve the desired cooling requirements of the compartment. Optimal energy efficiency is the minimal amount of energy spent in keeping up with the baseline cooling efficiency of the refrigerated compartment. External environmental factors are taken into consideration while calculating the optimal energy efficiency since the energy required may vary during the trip due to external factors such as weather, traffic, regulatory conditions, and the like.

The energy storage module 5 may be mounted in an external enclosure on the vehicle and a combination of ambient air and cooled air from the refrigerated compartment of the vehicle may be used as a coolant for the at least one rechargeable battery of the energy storage module 5.

While the present invention and its various functional components and operational functions have been described in particular exemplary embodiments, the invention may also be implemented in hardware, software, firmware, middleware or a combination thereof and utilized in systems, subsystems, components or subcomponents thereof. In particular embodiments implemented in software, elements of the present invention may be instructions and/or code segments to perform the necessary tasks. The program or code segments may be stored in a machine readable medium, such as a processor readable, such as a processor readable medium or a computer program product, or transmitted by a computer data signal embodied in a carrier wave, or a signal modulated by a carrier, over a transmission medium or communication link. The machine readable medium or processor readable medium may include any medium that can store or transfer information in a form readable and executable by a machine, for example a processor, computer, etc.

An embodiment of the present invention relates to a computer storage product with a computer-readable medium having computer code thereon for performing various computer-implemented operations. The computer-readable media and computer code may be those specially designed and constructed for the purposes of the present invention, or they may be of the kind well known and available to those having skill in the computer software arts. Examples of computer-readable media include, but are not limited to: ROM and RAM devices including Flash RAM memory storage cards, sticks and chips, magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices including Flash RAM memory storage cards, sticks and chips, for example. Examples of computer code include machine code, such as produced by a compiler, and files containing higher-level code that are executed by a computer using an interpreter. For example, an embodiment of the invention may be implemented using any suitable scripting, markup and/or programming languages and development tools. Another embodiment of the invention may be implemented in hardwired circuitry in place of, or in combination with, machine-executable software instructions.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of this invention without departing from the scope thereof.

What is claimed is:

1. An apparatus comprising:
   a power management system, comprising:
      a processor; and
      a controller operably connected to the processor;
   an energy storage module operably connected to the power management system;
   a first temperature sensor operably connected to the power management system, the first temperature sensor configured to generate a first temperature signal as a function of a temperature inside a compartment of a temperature-controlled system;
   a second temperature sensor operably connected to the power management system, the second temperature sensor configured to generate a second temperature signal as a function of an ambient temperature outside of the compartment;
   a first voltage sensor operably connected to the power management system and to the energy storage module, the first voltage sensor configured to generate a first voltage signal as a function of a voltage of the energy storage module; and
   a second voltage sensor operably connected to the power management system and a vehicle electrical system, the vehicle electrical system supplying electrical power to a vehicle that is physically coupled to the compartment, the second voltage sensor configured to generate a second voltage signal as a function of a voltage of the vehicle electrical system,
   wherein the power management system is configured to receive the first temperature signal, the second temperature signal, the first voltage signal, the second voltage signal, and external signals related to a trip factor and a heat transfer factor, wherein the trip factor is determined based on parameters including a scheduled trip route, live and historical weather conditions of the scheduled trip route, live and historical traffic conditions of the scheduled trip route, and historical data related to previous trips, and wherein the heat transfer factor is determined based on parameters including size of the compartment, insulation rating of the compartment, and amount of cargo in the compartment, and to control power supplied to the temperature-controlled system as a function of the first temperature signal, the second temperature signal, the first voltage signal, the second voltage signal, and the external signals.

2. The apparatus of claim 1, wherein the energy storage module comprises at least one rechargeable battery, a battery temperature sensor connected to the at least one rechargeable battery, and a battery management system configured to maintain the at least one rechargeable battery at an optimal internal temperature.

3. The apparatus of claim 2, wherein the energy storage module is mounted in an external enclosure on the vehicle and a combination of ambient air and cooled air from the compartment is used as a coolant for the at least one rechargeable battery.

4. The apparatus of claim 1, wherein the energy storage module comprising at least one rechargeable battery and is operable to control charge and discharge functions of the energy storage module and to controllably connect and disconnect functions of the module and a compressor from an associated vehicle electrical system thereby avoiding excessive charging or discharging of the at least one rechargeable battery.

5. The apparatus of claim 1, wherein the power management system is retrofitted into an existing internal combustion engine vehicle and employs existing sensors in the vehicle.

6. The apparatus of claim 1, wherein the power management system recalculates power needed for the temperature-controlled system and varies at least one of: the speed of the compressor, the power supplied to a temperature-controlled system and energy transferred to the rechargeable battery which is charged by at least one of: solar power, an alternator on the vehicle, a generator, or a fuel cell, thereby optimizing power usage and run-time for the temperature-controlled system.

7. The apparatus of claim 1, wherein historical data related to previous trips include time taken to complete the trips, power consumed during the trips, number of stops during the trips, weather conditions during the trips and traffic conditions during the trips.

8. An apparatus comprising:
a temperature-controlled compartment, the temperature-controlled compartment configured to be transported by a vehicle, the vehicle comprising a vehicle electrical system;
a power management system, comprising a processor and a controller, operably connected to the processor, the power management system operably connected to the vehicle electrical system;
an energy storage module operably connected to the power management system;
a compressor operably connected to the power management system, the compressor configured to compress a working fluid, and the compressor further configured to be supplied with power by at least one of the energy storage module and the vehicle electrical system;
a first heat exchange element configured to transfer heat from the compartment to the working fluid;
a second heat exchange element configured to transfer heat from the working fluid to an ambient environment;
a first temperature sensor operably connected to the power management system, the first temperature sensor configured to generate a first temperature signal as a function of a temperature inside a compartment of a temperature-controlled system;
a second temperature sensor operably connected to the power management system, the second temperature sensor configured to generate a second temperature signal as a function of an ambient temperature outside of the compartment;
a first voltage sensor operably connected to the power management system and to the energy storage module, the first voltage sensor configured to generate a first voltage signal as a function of a voltage of the energy storage module; and
a second voltage sensor operably connected to the power management system and a vehicle electrical system, the vehicle electrical system supplying electrical power to a vehicle that is physically coupled to the compartment, the second voltage sensor configured to generate a second voltage signal as a function of a voltage of the vehicle electrical system;
wherein the power management system is configured to receive the first temperature signal, the second temperature signal, the first voltage signal, the second voltage signal, and external signals related to a trip factor and a heat transfer factor, wherein the trip factor is determined based on parameters including a scheduled trip route, live and historical weather conditions of the scheduled trip route, live and historical traffic conditions of the scheduled trip route, and historical data related to previous trips, and wherein the heat transfer factor is determined based on parameters including size of the compartment, insulation rating of the compartment, and amount of cargo in the compartment, and to control power supplied to the temperature-controlled system as a function of the first temperature signal, the second temperature signal, the first voltage signal, the second voltage signal, and the external signals.

9. The apparatus of claim 8, wherein the first heat exchange element is an evaporator and the second heat exchange element is a condenser.

10. The apparatus of claim 8, further comprising a location sensor configured to generate a location signal as a function of the location of the location sensor with respect to a reference, wherein the power management system is configured to receive the location signal and to control power supplied to the temperature-controlled system as a function of the location signal.

11. The apparatus of claim 8, wherein historical data related to previous trips include time taken to complete the trips, power consumed during the trips, number of stops during the trips, weather conditions during the trips and traffic conditions during the trips.

12. The apparatus of claim 8, wherein the energy storage module comprises at least one rechargeable battery, a battery temperature sensor connected to the at least one rechargeable battery, and a battery management system configured to maintain the at least one rechargeable battery at an optimal internal temperature.

13. The apparatus of claim 12, wherein the energy storage module is mounted in an external enclosure on the vehicle and a combination of ambient air and cooled air from the compartment is used as a coolant for the at least one rechargeable battery.

14. The apparatus of claim 8, wherein the energy storage module comprising at least one rechargeable battery and is operable to control charge and discharge functions of the energy storage module and to controllably connect and disconnect functions of the module and a compressor from an associated vehicle electrical system thereby avoiding excessive charging or discharging of the at least one rechargeable battery.

15. The apparatus of claim 8, wherein the power management system is retrofitted into an existing internal combustion engine vehicle and employs existing sensors in the vehicle.

16. The apparatus of claim 8, wherein the power management system recalculates power needed for the temperature-controlled system and varies at least one of: the speed of the compressor, the power supplied to a temperature-controlled system and energy transferred to the rechargeable battery which is charged by at least one of: solar power, an alternator on the vehicle, a generator, or a fuel cell, thereby optimizing power usage and run-time for the temperature-controlled system.

17. The apparatus of claim 8, wherein the power management system notifies an operator of the vehicle with information pertaining to the trip factor including one or more routes to be taken by the vehicle to achieve an optimal energy efficiency while maintaining a baseline cooling efficiency within the compartment.

18. The apparatus of claim 17, wherein the operator is a human operator or a navigation controller of an autonomous vehicle.

* * * * *